(12) United States Patent
Laplace et al.

(10) Patent No.: US 10,677,916 B2
(45) Date of Patent: Jun. 9, 2020

(54) METHOD AND DEVICE FOR DETERMINING THE POSITION OF AN AIRCRAFT IN AN APPROACH FOR A LANDING

(71) Applicant: Airbus Operations SAS, Toulouse (FR)

(72) Inventors: Olivier Laplace, Colomiers (FR); Camille Caruhel, Toulouse (FR); Pascal Laurens, Saint-Paul sur Save (FR)

(73) Assignee: Airbus Operations SAS, Toulouse (FR)

( * ) Notice: Subject to any disclaimer, the term of this patent is extended or adjusted under 35 U.S.C. 154(b) by 243 days.

(21) Appl. No.: 15/653,709

(22) Filed: Jul. 19, 2017

(65) Prior Publication Data

US 2018/0024237 A1  Jan. 25, 2018

(30) Foreign Application Priority Data

Jul. 21, 2016 (FR) ..................... 16 56937

(51) Int. Cl.
*G01S 13/91* (2006.01)
*G01S 1/00* (2006.01)
(Continued)

(52) U.S. Cl.
CPC ............ *G01S 13/913* (2013.01); *B64D 45/04* (2013.01); *G01C 23/00* (2013.01); *G01S 1/00* (2013.01);
(Continued)

(58) Field of Classification Search
CPC .......... G01S 13/913; G01S 11/12; G01S 1/00; G01S 2013/916; G06T 7/73;
(Continued)

(56) References Cited

U.S. PATENT DOCUMENTS 3,896,432 A * 7/1975 Young ................. G01C 23/005
342/182
5,483,241 A   1/1996 Waineo et al.
(Continued)

OTHER PUBLICATIONS

French Search Report, 20147-04-21, priority document.
"Autonomous Precision Approach and Landing System." Loss et al., May 26, 1994.

*Primary Examiner* — Alan D Hutchinson
(74) *Attorney, Agent, or Firm* — Greer, Burns & Crain Ltd.

(57) ABSTRACT

A device comprising a radar for taking at least one radar image of the terrain in front of the aircraft in a zone containing at least one characteristic pattern, the position of the characteristic pattern being known, an image processing unit for detecting, on the radar image taken by the radar, a characteristic symbol representing the characteristic pattern, a computation unit for determining, from at least the position of the characteristic symbol in the image and from characteristics of the radar image acquisition, relative position information illustrating the position of the aircraft in relation to the characteristic pattern, and for determining the position of the aircraft, from the relative position information and from the known position of the characteristic pattern, and a unit for transmitting at least the position of the aircraft to at least one user system, for example a landing aiding system or an SVS display.

12 Claims, 3 Drawing Sheets

(51) Int. Cl.
*G06T 7/73* (2017.01)
*G06K 9/00* (2006.01)
*B64D 45/04* (2006.01)
*G01C 23/00* (2006.01)
*G01S 11/12* (2006.01)
*G05D 1/06* (2006.01)

(52) U.S. Cl.
CPC ............ *G01S 11/12* (2013.01); *G05D 1/0684* (2013.01); *G06K 9/00798* (2013.01); *G06T 7/73* (2017.01); *G01S 2013/916* (2013.01); *G06T 2207/10044* (2013.01); *G06T 2207/30184* (2013.01); *G06T 2207/30204* (2013.01); *G06T 2207/30256* (2013.01)

(58) Field of Classification Search
CPC . G06T 2207/30256; G06T 2207/30204; G06T 2207/30184; G06T 2207/10044; G06K 9/00798; B64D 45/04; G01C 23/00; G05D 1/0684
See application file for complete search history.

(56) References Cited

U.S. PATENT DOCUMENTS

| | | | | |
|---|---|---|---|---|
| 5,654,890 A * | 8/1997 | Nicosia | ............... | G01C 21/165 701/16 |
| 5,736,955 A * | 4/1998 | Roif | ...................... | G01S 13/913 342/1 |
| 6,233,522 B1 * | 5/2001 | Morici | ............... | G01C 21/005 342/64 |
| 6,311,108 B1 * | 10/2001 | Ammar | ............... | F41G 7/2226 701/16 |
| 7,579,978 B1 * | 8/2009 | Finley | ................... | G01S 7/412 342/33 |
| 8,160,758 B2 * | 4/2012 | Call | ..................... | G01C 21/165 701/14 |
| 9,836,064 B2 * | 12/2017 | Yochum | ............... | G01S 13/913 |
| 2002/0147544 A1 * | 10/2002 | Nicosia | ............... | F21V 21/108 701/500 |

* cited by examiner

METHOD AND DEVICE FOR DETERMINING THE POSITION OF AN AIRCRAFT IN AN APPROACH FOR A LANDING

CROSS-REFERENCES TO RELATED APPLICATIONS

This application claims the benefit of the French patent application No. 1656937 filed on Jul. 21, 2016, the entire disclosures of which are incorporated herein by way of reference.

TECHNICAL FIELD

The present invention relates to a method and a device for determining the position of an aircraft, in particular of a transport airplane, in an approach for a landing at an airport.

BACKGROUND OF THE INVENTION

It is known that bad weather conditions (fog, rain, snow, etc.) are one of the main sources of disturbances for airport operations. In particular, they reduce the visibility, thus limiting the capacities of the pilots to see the runway and its environment, possibly as far as preventing the aircraft from taking off or from setting down. That generates delays, even flight cancellations that are costly for the air transport industry.

Normally, in an approach for a landing, the solutions proposed for guiding the aircraft to the runway when the visibility is too degraded by weather conditions, are based on a ground infrastructure participating actively in the guiding of the aircraft. The deployment and maintaining in operational condition of such an infrastructure however have a not-inconsiderable cost, limiting the deployment in some regions of the world.

The aim of the present invention is to propose an aid to the guiding of an aircraft to the landing runway that does not require a ground infrastructure, or a passive infrastructure (that is to say without electronic means), while limiting the extra cost at the aircraft level.

To be able to implement an appropriate approach, notably offering the same operational advantages as a precision approach, without using an instrument landing aiding system of the ILS (Instrument Landing System) type, there needs to be accurate aircraft position information available.

SUMMARY OF THE INVENTION

The present invention relates to a method for accurately and inexpensively determining the position of an aircraft in an approach for a landing.

To this end, according to the invention, the method comprises a series of steps comprising:
  a radar image acquisition step, implemented by at least one radar mounted on the aircraft, the acquisition step comprising taking at least one radar image of the terrain in front of the aircraft in a zone containing at least one characteristic pattern, the position of the characteristic pattern being known;
  an image processing step, implemented by an image processing unit and comprising at least detecting, on the radar image, a characteristic symbol representing the characteristic pattern;
  a computation step, implemented by a computation unit and comprising determining, from at least the position of the characteristic symbol in the radar image and from characteristics of the radar image acquisition, so-called relative position information illustrating the position of the aircraft in relation to the characteristic pattern, and in determining the position of the aircraft, from the relative position information and from the known position of the characteristic pattern; and
  a data transmission step, implemented by a data transmission unit and comprising transmitting at least the position of the aircraft to at least one user system.

Advantageously, the series of steps is implemented, repetitively, in the approach.

Thus, by virtue of the invention, it is possible to accurately determine the position of the aircraft, by using an embedded radar, preferably a weather radar.

This determination of position does not require any installation on the ground and preferably uses a radar that already exists on the aircraft, which makes it possible to reduce the cost. Furthermore, it is thus possible to extend the capacity to land aircraft in bad weather to a greater number of airports.

In a preferred embodiment:
  the image processing step also comprises determining a deformation of the characteristic symbol in the radar image, due to the perspective linked to the angle from which the characteristic pattern is seen from the radar mounted on the aircraft during the radar image capture; and
  the computation step uses the deformation of the characteristic symbol thus determined, to estimate the attitude and the heading of the aircraft.

In a preferred embodiment, the characteristic pattern represents at least one of the following elements:
  a landing runway used for the landing;
  at least one reflecting device, which exhibits a reflectivity greater than that of the terrain and which is installed on the terrain; and
  a natural configuration of the terrain.

Advantageously, the image processing step:
  implements a consolidation of the detection of the characteristic pattern; and/or
  uses a shape recognition method.

In a particular embodiment, the series of steps comprises a monitoring step, implemented by a monitoring unit, after the computation step, and comprising checking the consistency of the position of the aircraft determined in the computation step.

Furthermore, advantageously, the series of steps comprises a step of extrapolation of the position of the aircraft, the extrapolation step being implemented by an extrapolation unit between two positions determined from two successive radar images of the characteristic pattern, the extrapolation step being implemented using auxiliary data, from at least one system other than the radar.

Moreover, advantageously, the series of steps comprises a realignment step, implemented by an updating unit, after the computation step, and comprising updating a so-called operational position of the aircraft using the position of the aircraft determined in the computation step.

In a particular embodiment, the series of steps is implemented early before a given approach phase corresponding to a part of the approach, checks being carried out on the results obtained then, and the results of the series of steps obtained during the given approach phase being used during this approach phase only if given conditions, partly relating to the checks, are met.

The present invention relates also to a landing assistance method, which uses at least the position of the aircraft determined by the method described above, to assist in the landing (manual or automatic) of the aircraft.

The present invention relates also to a device for determining the position of an aircraft in an approach for a landing.

According to the invention, the device is noteworthy in that it comprises:
- at least one radar configured to take at least one radar image of the terrain in front of the aircraft in a zone containing at least one characteristic pattern, the position of the characteristic pattern being known;
- an image processing unit configured to detect, on the radar image taken by the radar, a characteristic symbol representing the characteristic pattern;
- a computation unit configured to determine, from at least the position of the characteristic symbol in the image and characteristics of the radar image acquisition, so-called relative position information illustrating the position of the aircraft in relation to the characteristic pattern, and to determine the position of the aircraft, from the relative position information and from the known position of the characteristic pattern; and
- a data transmission unit configured to transmit at least the position of the aircraft to at least one user system.

Moreover, in a particular embodiment, the device comprises at least one of the following units:
- an extrapolation unit configured to extrapolate the position of the aircraft;
- an updating unit configured to update the position of the aircraft; and
- a monitoring unit configured to check the consistency of the position of the aircraft.

The present invention relates also to a landing aiding system, which comprises at least one device for determining the position of an aircraft, as described above.

In a particular embodiment, the landing aiding system comprises two devices for determining the position of an aircraft, independent of one another, and it is configured to implement an automatic landing of the aircraft.

Furthermore, in another embodiment, the landing aiding system comprises a synthetic vision system using at least the position determined by the device for determining the position, to assist in the display.

The present invention also relates to an aircraft, in particular a transport airplane, which is provided with such a device for determining the position of an aircraft and/or such a landing aiding system.

BRIEF DESCRIPTION OF THE DRAWINGS

The attached figures will give a good understanding of how the invention can be produced. In these figures, identical references denote similar elements.

DETAILED DESCRIPTION OF THE PREFERRED EMBODIMENTS

Figure 1:
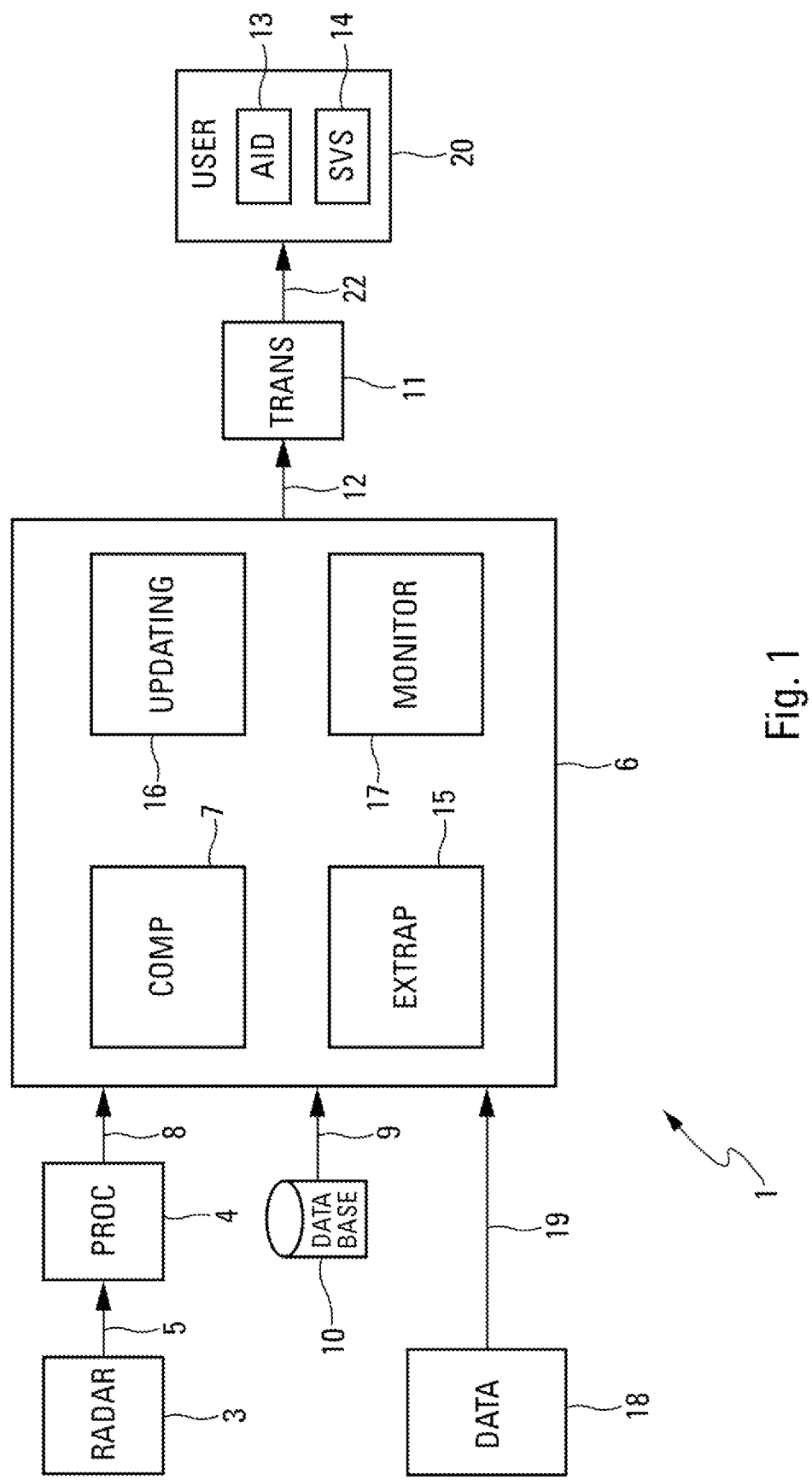
FIG. 1 is a block diagram of a device for determining the position of an aircraft in an approach for a landing, which illustrates an embodiment of the invention.
Figure 2:
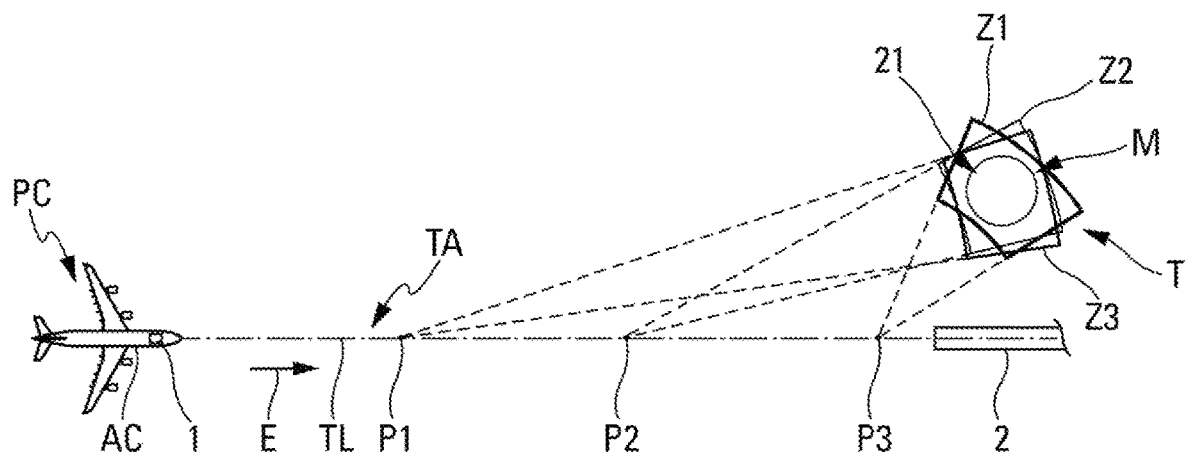
FIGS. 2 and 3 are graphs illustrating a descent trajectory of an aircraft, respectively in a horizontal plane and in a vertical plane.
Figure 3:
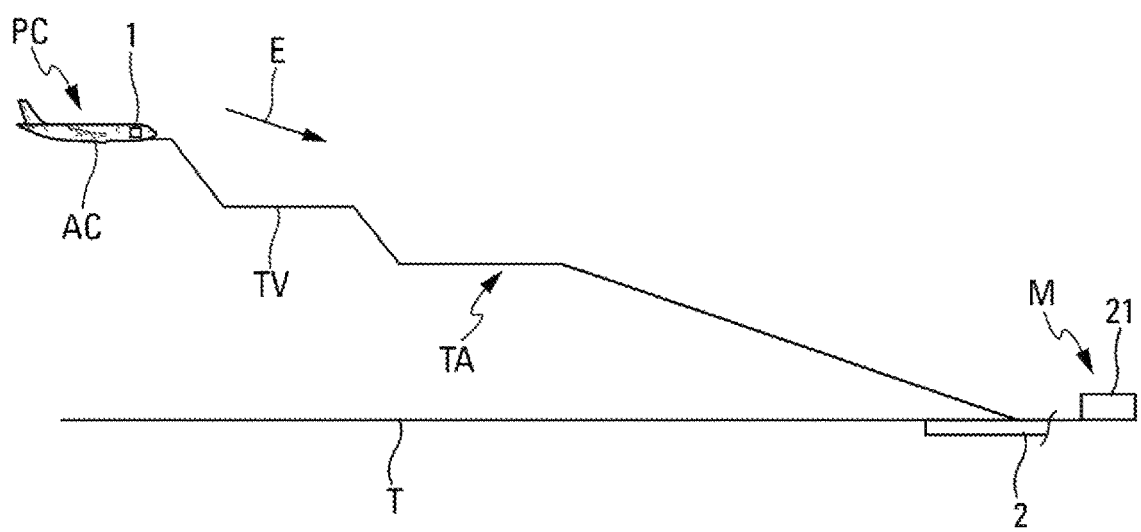

The device 1, schematically represented in FIG. 1 and making it possible to illustrate the invention, is intended to determine flight characteristics (including at least the position PC) of an aircraft AC, in particular of a transport aircraft, in an approach for a landing on a landing runway 2 of an airport (FIGS. 2 and 3).

FIGS. 2 and 3 illustrate an example of approach, respectively in the horizontal plane and in the vertical plane, of the aircraft AC flying according to a trajectory TA comprising a lateral trajectory TL in the horizontal plane (FIG. 2) and a vertical trajectory TV in the vertical plane (FIG. 3), in a direction indicated by an arrow E.

According to the invention, the device 1, which is embedded on the aircraft AC, comprises, as represented in FIG. 1:
- at least one radar 3 (RADAR) configured to take at least one radar image of the terrain T in front of the aircraft (in the direction E) in a zone Z1, Z2, Z3 (FIG. 2) containing at least one characteristic pattern M, the position of the characteristic pattern M being known;
- an image processing unit 4 (PROC) linked via a link 5 to the radar 3 and configured to detect, on the radar image taken by the radar 3, a characteristic symbol representing the characteristic pattern;
- a central processing unit 6 comprising a computation unit 7 (COMP) and linked via links 8 and 9, respectively, to the image processing unit 4 and to a database 10 (DATABASE), this computation unit 7 being configured to determine:
- so-called relative position information (illustrating the position of the aircraft in relation to the characteristic pattern), from at least the position of the characteristic symbol in the image and characteristics of the radar image acquisition; and
- the position of the aircraft, from the relative position information and from the known position of the characteristic pattern; and
- a data transmission unit 11 (TRANS) linked via a link 12 to the central processing unit 6 and configured to transmit at least the position of the aircraft, to a set 20 of user system(s) (USER) comprising at least one user system 13, 14, via a link 22.

In a particular embodiment, the device 1 also comprises an extrapolation unit 15 (EXTRAP). This extrapolation unit 15 is, for example, incorporated in the central processing unit 6, and it is configured to extrapolate the position of the aircraft. The extrapolation is implemented by the extrapolation unit 15 between two successive determinations of positions (determined from two successive radar images of the characteristic pattern). This extrapolation step is implemented using auxiliary data, from at least one system other than the radar 3, as specified herein below. This system, other than the radar 3, forms part of a set 18 of sources of information, specified herein below.

Furthermore, in a particular embodiment, the device 1 also comprises a data updating unit 16 (UPDATING). This data updating unit 16 is, for example, incorporated in the central processing unit 6, and it is configured to determine an updated position of the aircraft by updating a so-called operational position of the aircraft, using the position of the aircraft determined by the computation unit 7. This updated position of the aircraft is used by at least one system of the aircraft, for example to guide the aircraft. The operational position of the aircraft corresponds to a position used normally by such a system of the aircraft to guide the aircraft. It is, for example, an inertial position, a position determined by a GNSS satellite navigation system or even an inertial position hybridized with a position determined by a GNSS satellite navigation system. The data transmission unit 11 is then configured to transmit at least the updated position of the aircraft to the set 20 of user system(s). The position determined by the computation unit 7 is not necessarily transmitted to the set 20 of user system(s).

Moreover, the device 1 also comprises a monitoring unit 17 (MONITOR). This monitoring unit 17 is, for example, incorporated in the central processing unit 6, and it is configured to check the consistency at least of the position of the aircraft determined by the computation unit 7.

Furthermore, the device 1 also comprises the set 18 of sources of information (DATA). This set 18 is linked via a link 19 to the central processing unit 6, and it comprises standard systems capable of generating current values of flight parameters of the aircraft.

Preferably, the radar 3 is an X band radar, which is generally installed on the aircraft, notably on airliners, to supply weather information.

For the implementation of the present invention, at least one characteristic pattern M (FIGS. 2 and 3) that can be detected by the radar 3 has been identified or created on the airport or in proximity thereto, at a location (or position) that is accurately known. The coordinates of the position of the characteristic pattern M are known and saved in the database 10. These coordinates can be known in absolute terms (that is to say in a terrestrial reference system, typically the WGS84 reference system) or in relation to the aiming point inside the contact or touchdown zone of the runway 2. In the context of the present invention, the coordinates of the characteristic pattern M can have been input manually by the crew (via a standard input means (keyboard, touchscreen, etc.) forming part of the set 18), have been loaded using a standard input means into the database 10 during the flight preparation, or even be stored permanently in the database 10.

The characteristic pattern M is chosen (or created) such that:
  its shape and/or the intensity of the radar echoes that it generates, are such that it cannot be confused with other echoes originating from the ground (terrain T), upon the radar detection using the embedded radar 3; and
  the radar 3 is able to distinguish the characteristic pattern M from a given distance compatible with the envisaged application.

In a preferred embodiment, the characteristic pattern M represents at least one of the following elements:
  the landing runway 2 used for the landing. The landing runway forms a non-reflecting rectangle in the middle of the echoes from the ground. The detection of the landing runway 2 can be confirmed via the knowledge of its dimensions and of its orientation, known beforehand;
  at least one reflecting device 21 with strong radar contrast, which exhibits a reflectivity greater than that of the terrain T and which is installed on the terrain T, as represented schematically in FIGS. 2 and 3; and
  a natural configuration of the terrain, such as a road, a bridge or a water course for example.

In the latter case, the characteristic pattern M represents a natural configuration of the terrain in the environs of the airport. This configuration has been previously identified and stored in the database 10 (shape and position of the pattern).

In the case of a reflecting device 21 (FIGS. 2 and 3) with strong radar contrast, the characteristic pattern M comprises a reflecting element, and preferably a plurality of reflecting elements, the reflectivity of which is very much greater than those of their environment (for example radar reflectors, an approach ramp, etc.). These reflecting elements are positioned relative to one another so as to constitute a characteristic pattern M which cannot be confused with the other echoes from the ground. Furthermore, preferably, their disposition is optimized to allow the aircraft to position itself accurately in relation to them.

Furthermore, the size and the shape of the reflecting element 21 influence the possibility of estimating the attitude and the heading of the aircraft. The shape of the characteristic pattern M is also available in the database 10 of the device 1. As with its coordinates, the shape of the characteristic pattern M can have been input manually by the crew, have been loaded into the database 10 during the flight preparation, or be stored permanently in the database 10.

Many applications are possible for the device 1 with different user systems. Thus, the updated position of the aircraft can, in particular, serve, as specified herein below:
  to carry out an approach in automatic mode, for example up to 30 meters approximately above the threshold of the runway 2. The aircraft can even go as far as landing automatically. In this case, the last radar scan takes place a few instants before the actual landing (that is to say before the contact with the ground). The position of the aircraft is then extrapolated from the last scan by using the updated navigation. A specific monitoring during the approach makes it possible to guarantee the integrity of the navigation system once updated;
  to carry out an approach by instruments, in manual mode, by means of diversions displayed in the cockpit; and
  to improve the accuracy of a synthetic image of a synthetic vision system of SVS type.

The device 1 relies on the capacity of the radar 3 to supply the vector position of an echo in the reference system of the radar 3. In the coordinate of the foot of the antenna of the radar, the position of the echo is characterized by its distance, its azimuth and its elevation angle. Furthermore, the geographic position of the characteristic pattern having generated the radar echo (reference point) is known, to deduce the position of the aircraft therefrom. The computation unit 7 comprises computation elements for carrying out, respectively, the following computations:
  converting the position vector of the echo of the coordinate of the foot of the antenna, to the aircraft coordinate;
  converting the position vector of the echo of the aircraft coordinate to the geographic coordinate; and
  subtracting the position vector of the echo from the geographic coordinates of the reference point, to obtain the coordinates of the position of the aircraft.

The operation of the device 1, as described above, is specified herein below.

The radar 3 of the device 1 is used to scan the terrain T (being flown over) in front of the aircraft (in front and downward) in the direction of flight E of the aircraft AC (FIGS. 2 and 3). The sector to be scanned is determined so as to include the zone Z1, Z2, Z3 containing the characteristic pattern M, as represented in FIG. 2 showing scans carried out for three successive positions P1, P2 and P3 of the aircraft AC during the approach, by taking account of its position, of the inaccuracy of the navigation means of the aircraft (position, attitude and heading) and of the aiming inaccuracy of the radar beam. The radar 3 supplies, for each pair formed by the beam aiming azimuth and elevation angle, the power and the distance of the echo received.

In the case where the characteristic pattern is obtained by a device with strong radar contrast, provision is made in one embodiment to filter (that is to say eliminate) the echoes for which the return power is too weak to originate from a reflector, given their distance. That makes it possible to eliminate a maximum of spurious echoes.

By using the azimuth, elevation angle and distance information, the image processing unit 4 of the device 1 projects the echo power data into the horizontal plane in order to create a 2D (two-dimensional) view of the intensity of the ground echoes.

An image processing algorithm, of shape recognition ("pattern matching") type, is then used by the image processing unit 4 to identify the position, the orientation and the distortion (scaling) of the characteristic symbol (representing the characteristic pattern M) in the 2D view of the intensity of the ground echoes. The attitude or elevation angle aiming errors of the radar beam are equivalent to a projection onto a slightly inclined plane, which leads to a distortion of pattern scaling type in the 2D view. The aircraft heading or radar beam azimuth aiming errors are equivalent to a rotation of the pattern in the 2D view.

For this, either image processing algorithms are used to manage the distortion, or several images are created by projection onto a set of different inclined planes and of different rotations in order to estimate the aircraft attitude and heading and radar beam aiming errors.

The information on position, orientation and distortion of the characteristic symbol in the 2D view of the intensity of the ground echoes is used in addition to the echo azimuth, elevation angle and distance information supplied by the radar to compute the 3D coordinates of the characteristic pattern in relation to the aircraft.

Knowing the position of the characteristic pattern M, for example relative to the runway 2 (or preferably relative to the aiming point), the computation unit 7 deduces therefrom the position of the aircraft in relation to the aiming point.

To carry out the computation of the updated position on the radar measurements, the device 1 performs relative position radar measurements, periodically.

On each relative position radar measurement, the central processing unit 6 of the device 1 computes:
- the best estimate of the position of the aircraft (updated position of the aircraft), given the known accuracy of the position information supplied by the radar and possibly from inertial units and/or GNSS (Global Navigation Satellite System) equipment of the aircraft, which form part of the set 18 of sources of information. Known accuracy should be understood to mean the accuracy guaranteed for these various systems, deriving from aeronautical standards, from specifications of this equipment and/or from experience feedback;
- the best estimate of the attitude and of the heading of the aircraft (updated attitude and heading), given the attitude information supplied by the radar and the inertial units, and their known accuracy, as well as the aggregation of position information over several radar measurements; and
- the estimation of the inertial position errors, of the GNSS position errors, of the inertial attitude and heading errors, and of the radar antenna mounting error.

In order to be able to provide the user system(s) 13, 14 with position information at a sufficient frequency, notably to carry out an approach operation, between two (successive) relative position radar measurements, the extrapolation unit 15 extrapolates the position, the attitude and the heading of the aircraft. The extrapolation unit 15 extrapolates these aforementioned parameters from the updated position, attitude and heading, as well as from the data supplied by the inertial units and the GNSS equipment by correcting the latter of the estimated position, attitude and heading errors. The use of GNSS data is optional. By limiting the drift of the inertial units, the GNSS data make it possible to space apart the relative position radar measurements.

In one embodiment, the computation, estimation and extrapolation units of the central processing unit 6 use at least one Kalman filter. The Kalman filter makes it possible to progressively refine the estimation of the state of the aircraft (position, attitude, heading) and of the various error contributors, over the course of the generation of the relative position radar measurements.

The input data of the Kalman filter are, typically:
- the relative position radar measurement (with its performance and noise characteristics);
- the GNSS position;
- the inertial accelerations and the inertial angular velocities; and
- the inertial position, velocity, attitude and heading, on initialization of the filter.

The states estimated by the Kalman filter are, typically:
- the attitude and the heading of the aircraft;
- the velocity of the aircraft;
- the position of the aircraft;
- the inertial biases (accelerometers and gyrometers);
- the biases on the GNSS position; and
- the radar antenna mounting errors.

In order in particular to be able to warn the pilot in case of malfunction of an aircraft position generation system (for example forming part of the set 18), the monitoring unit 17 implements a monitoring of the consistency of the various items of position information.

The position information items considered are:
- the position of the aircraft, deduced from the relative position radar measurement, by taking account of the known position of the characteristic pattern;
- the GNSS position; and
- the pure inertial position.

This monitoring can be implemented in different ways by the monitoring unit 17.

In a first implementation, the monitoring unit 17 uses the difference in the abovementioned position information items, taken two by two. The information items are considered to be inconsistent if the difference exceeds, by a factor chosen in advance, the quadratic sum of the guaranteed accuracies of the two position information items.

In a second implementation, the monitoring unit 17 uses the difference between each information item and the updated position. An item of information is considered as inconsistent or incorrect, if the difference exceeds, by a factor chosen in advance, the quadratic sum of the guaranteed accuracy of the information item considered and of the estimated accuracy for the updated position.

Furthermore, in a third implementation, the monitoring unit 17 uses the value computed by the Kalman filter for each position information item. The information item is considered as inconsistent or incorrect, if the value exceeds, by a factor chosen in advance, the covariance estimated for this information item by the Kalman filter.

Figure 4:
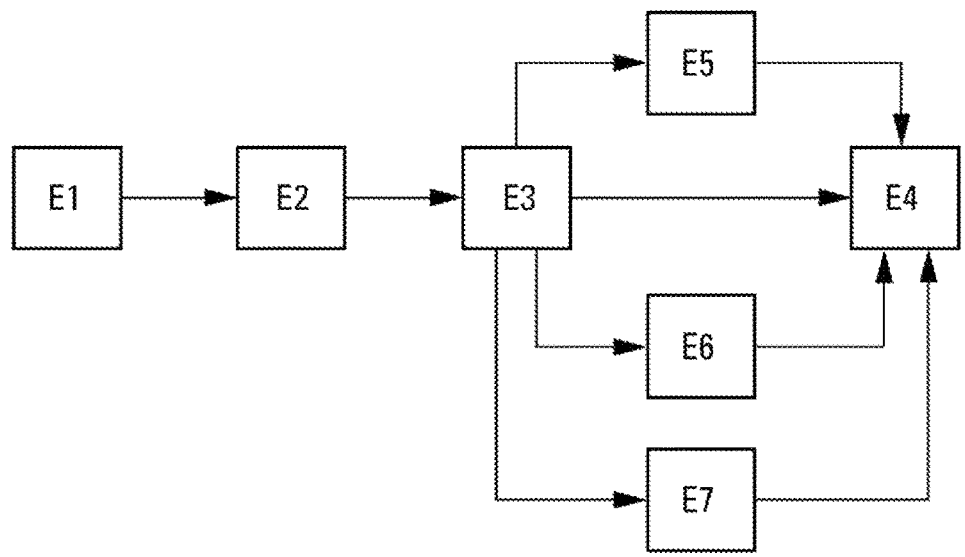
FIG. 4 is the block diagram of a method for determining the position of an aircraft in an approach for a landing.

Consequently, the device 1 implements a method for assisting in the determination at least of the position of the aircraft. This method comprises a series of steps, represented in FIG. 4 and implemented repetitively during a descent of the aircraft AC along the flight trajectory TV followed (in the direction illustrated by the arrow E in FIGS. 2 and 3), for a landing on the landing runway 2;

a step of acquisition E1, implemented by the radar 3, comprising taking at least one radar image of the terrain T in front of the aircraft in a zone containing at least the characteristic pattern M, the position of which is known;

an image processing step E2, implemented by the image processing unit 4, comprising at least detecting, on the radar image, a characteristic symbol representing the characteristic pattern M;

a computation step E3, implemented by the computation unit 7, comprising:

determining, from at least the position of the characteristic symbol in the image and from characteristics of the radar image acquisition, so-called relative position information illustrating the position of the aircraft AC in relation to the characteristic pattern M; and determining the position of the aircraft AC, from the relative position information and from the known position of the characteristic pattern M; and a data transmission step E4, implemented by the data transmission unit 11, comprising transmitting at least the position of the aircraft to at least one user system 13, 14.

In a preferred embodiment:

the image processing step E2 also comprises determining a deformation of the characteristic symbol in the radar image, due to the perspective linked to the angle from which the characteristic pattern M is seen from the radar 3 mounted on the aircraft during the radar image capture; and the computation step E3 uses the deformation of the characteristic symbol thus determined, to estimate the attitude and the heading of the aircraft, which are also transmitted (in the data transmission step E4) to at least one user system 13, 14.

Moreover, in a particular embodiment, the method comprises at least one of the following steps:

an extrapolation step E5, implemented by the extrapolation unit 15, comprising extrapolating the position of the aircraft;

an updating step E6, implemented by the updating unit 16, comprising updating the position of the aircraft, determined in the computation step E3; and a monitoring step E7, implemented by the monitoring unit 17, comprising checking the consistency of the position of the aircraft, determined in the computation step E3.

The results of the extrapolation E5, updating E6 and monitoring E7 steps are also transmitted to at least one user system 13, 14 in the data transmission step E4.

Two possible applications of the invention are described herein below.

A first application relates to the implementation of the invention for a precision approach.

In this case, the aircraft is considered to perform an approach to an airport using a non-precision approach means. The device 1 is particularly useful if one or more obstacles are located in proximity to the approach trajectory involving raised minima, for example a decision altitude of 180 meters or more, above the touchdown zone. Raised minima can make the approach impractical in bad weather conditions (for example with visibility less than 3400 meters).

In the application envisaged, the device 1 supplies information to a landing aiding system 13 (AID) as user system.

Figure 5:
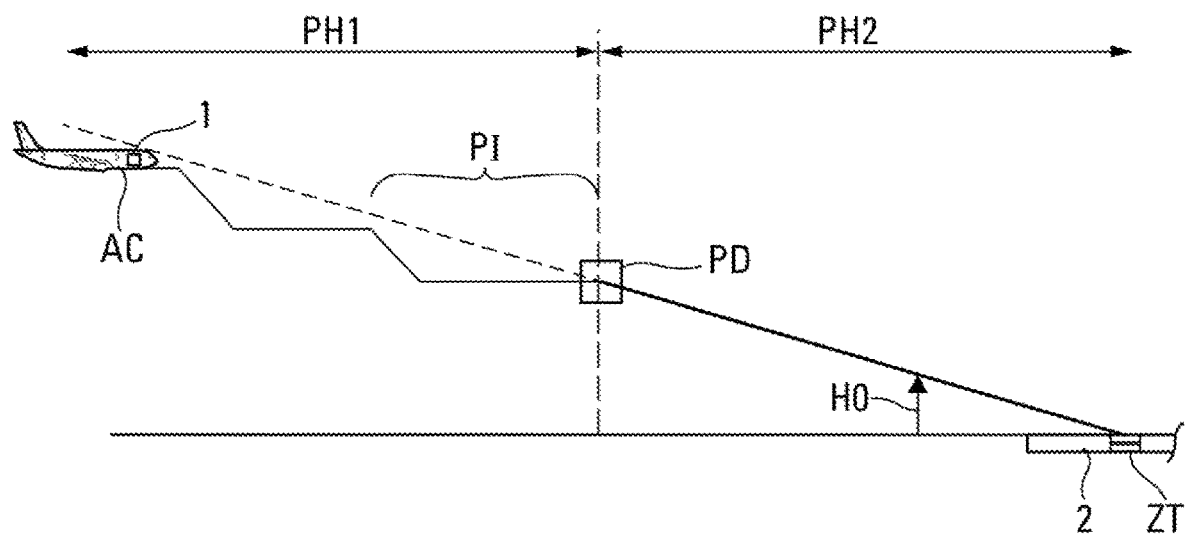
FIG. 5 is a graph illustrating an application relating to a precision approach.

In this application, the approach is divided into two successive phases, as represented in FIG. 5.

A first phase PH1 comprises carrying out a non-precision approach with standard guidance means (VOR, NDB or RNAV GNSS). This first phase PH1 lasts until the decision altitude (or minimum descent altitude) is reached, at a point PD, corresponding to the guidance means used.

The second phase PH2 comprises carrying out an approach equivalent to a precision approach, based on the position of the aircraft AC updated on the radar measurements. Depending on the position accuracy obtained, on the position of the characteristic pattern M and on the systems available on board the aircraft, the second phase PH2 can continue to a given height HO (for example 30 meters) above the touchdown zone ZT, or continue to a complete landing.

At the end of the first phase PH1 (typically the last 10 seconds of this first phase PH1), a transition period PI is provided. The aim of this transition period PI is:

to prepare the second phase PH2; and to provide the pilot with the information elements enabling him or her to take the decision to continue or cancel his or her approach on arriving at the decision altitude (point PD) at the end of this first phase PH1.

For this, during the transition period PI, the device 1 performs the first relative position radar measurements and initiates the computation of position of the aircraft, updated on the radar measurements. For this, the characteristic pattern M must be such that the radar can distinguish it from the start of the transition period PI.

The second phase PH2 is triggered only if the following conditions are met:

the relative position radar measurements are repeated successfully (no intermittent loss);

the accuracy of the computation of the position of the aircraft, estimated by analysis of the consistency between the different position sources available (IRS, radar and/or GNSS), satisfies the performance criteria of a category II type precision approach; and the drift of the inertial position (or of the inertial position hybridized with the GNSS and/or the radar) is acceptable.

This drift is checked for a period of time making it possible to cover the longest of the following periods:

the time interval between two radar updates; and the period at the end of the approach where it is no longer possible to perform relative position radar measurements, because of the unfavorable position of the characteristic pattern in relation to the aircraft (pattern too far to the side to be able to be scanned by the radar, height of the aircraft above the pattern too low to be able to detect it, masking of the pattern by terrain elements, etc.). This period can include all or part of the flare and of the landing.

If all of the above conditions are met, the landing aiding system 13 indicates to the pilot that it is ready for the second phase.

In a particular embodiment, the landing aiding system 13 comprises two devices 1 for determining the position of the aircraft, independent of one another, and it is configured to implement an automatic landing of the aircraft. To be able to carry out an automatic landing, it is in fact necessary to duplicate the processing chains to cover the loss of a computer.

A second application of the invention relates to the use of the results supplied by the device 1 in the context of a display of SVS type.

In this case, it is considered that the user system 14 is an SVS display (FIG. 1). This SVS display is installed on board the aircraft, and the aircraft performs an approach to an airport using a non-precision approach means. Because of the limited accuracy of the approach means, an offset can appear between the positioning of the runway in the SVS display and the reality. This offset originates from the aircraft position error (supplied by the approach means) used to compute the image of the SVS display. There is therefore an offset in point of view. This offset is all the more visible when the aircraft is approaching the runway. In case of display of the inertial speed vector on the SVS display, the offset of the runway then becomes so much more of an nuisance that it can give the impression to the crew that the aircraft is not directed toward the correct point.

In order to ensure a good fidelity of the image presented in the SVS display, the position of the aircraft updated on the radar measurements is used to compute the view to be displayed (instead of a hybridized position (inertial/GNSS)).

In this application, the approach can be subdivided into two parts.

During the first part of the approach, the SVS display, called basic SVS display, uses the hybridized position (inertial/GNSS) to generate the image to be displayed to the crew.

During the second part of the approach, the SVS display, called updated SVS display, uses the position of the aircraft, updated on the radar measurements using the device 1, to generate the image to be displayed to the crew.

The limit point of use of the basic SVS display (that is to say the end of the first part of the approach) is the point of the approach from which the offset of the runway in the SVS display becomes detectable by the pilot.

The characteristic pattern M used for the relative position radar measurements is chosen (upon the creation of the approach procedure) such that the radar can distinguish it at the latest when the aircraft reaches the limit point of use of the basic SVS display.

In order to ensure the fidelity of the image presented in the SVS display permanently without intervention from the pilot, the system continuously analyzes the parameters of the aircraft, in order to determine whether the latter is in the process of carrying out an approach and to determine on which runway. If the aircraft is in approach, the system recovers from the database 10 the characteristic pattern M associated with the runway and triggers the search for the pattern by the radar. This search is triggered a certain time before the aircraft reaches the limit point of use of the basic SVS display, so that the radar can identify the characteristic pattern M and perform the first relative position measurements at the end of the first part of the approach.

It is possible to determine that an aircraft is on approach to a runway, by using, for example, at least one of the following criteria:
the flight management system of the aircraft indicates that an approach mode is active; and
the analysis of the coordinates of the runways stored in a database shows that the horizontal distance between the aircraft and one of the runways is less than a predefined value, and also at least one of the following sub-criteria is satisfied:
the position of the aircraft (horizontal and vertical) is consistent with one of the approach trajectories published for this runway (stored in a database), that is to say, the lateral and vertical deviations relative to the trajectory are below predefined thresholds (consistent with the accuracy of the navigation means of the aircraft and with the tolerance existing on the execution of the approach procedures); and
the height of the aircraft above the runway is consistent with an approach slope (around 3° with a predefined tolerance) and the route of the aircraft is consistent with the orientation of the runway with a predefined tolerance; and
the speed of the aircraft lies within the range of approach speeds (determined by the performance levels of the aircraft).

Other criteria can also be used.

In the case where different characteristic patterns are used for the radar updates according to the end of the runway where the aircraft will land, the end of the runway and therefore the pattern to be considered can be determined for example:
using the end of the runway, selected by the crew by means of a system of the aircraft for example forming part of the set 18;
via the correlation between the position of the aircraft and the published approach trajectories; and
via the correlation between the route of the aircraft and the QFU orientation of the runway (expressed in degrees relative to magnetic north in the clockwise direction).

In the case where it is not possible to perform the updating of the position based on a radar image even though the aircraft is at a distance from the ground less than or equal to the limit point of use of the basic SVS display, a message and/or an alert are generated in order to warn the pilot that the fidelity of the representation of the SVS display is no longer guaranteed. This is necessary to obviate the risk of use by the crew of an image with an excessive offset.

The above case can occur if:
the systems have determined that the aircraft is on approach to a runway, but the radar has not been able to detect the characteristic pattern, and the distance to the runway is less than the limit of use of the SVS display; and
the systems have not determined that the aircraft is on approach to a runway, on the contrary they detect that the aircraft is in proximity to the terrain. The proximity with the terrain can be detected, for example, via at least one of the following criteria:
the height of the aircraft relative to the terrain is less than a predefined value;
the estimated time before collision with the ground is less than a predefined value. This computation assumes that the aircraft continues its route along a rectilinear trajectory and at a constant speed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for determining a position of an aircraft in an approach for a landing, the method comprising a series of steps comprising:
   a radar image acquisition step, implemented by at least one radar mounted on the aircraft, the acquisition step comprising taking at least one radar image of the terrain in front of the aircraft in a zone containing at least one characteristic pattern, the position of said characteristic pattern being known,
   wherein the characteristic pattern comprises a reflecting element, the reflectivity of which is great than that of the environment;
   an image processing step, implemented by an image processing unit and comprising at least detecting, on the radar image, a characteristic symbol representing said characteristic pattern,
   wherein the image processing step further comprises determining a deformation of the characteristic symbol in the radar image, due to a perspective linked to an angle from which the characteristic pattern is seen from the radar mounted on the aircraft during the radar image capture;
   a computation step, implemented by a computation unit and comprising determining, from at least the position of the characteristic symbol in the radar image and from characteristics of the radar image acquisition, relative position information illustrating the position of the aircraft in relation to the characteristic pattern, and determining the position of the aircraft from said relative position information and from the known position of the characteristic pattern,
   wherein the computation step uses the deformation of the characteristic symbol to determine an attitude and a heading of the aircraft;
   an updating step, implemented by an updating unit, after the computation step, and comprising determining an updated position of the aircraft by updating an operational position of the aircraft, using said position of the aircraft determined in the computation step;
   a monitoring step, implemented by a monitoring unit, comprising checking a consistency of the position of the aircraft determined in the computation step based on position information items,
   wherein the position information items comprise:
   the position of the aircraft, deduced from a relative position radar measurement;
   a GNSS position of the aircraft; and
   a pure inertial position of the aircraft;
   wherein the monitoring is implemented by:
      using differences in the position information items, taken two by two, and an inconsistency is determined when the differences exceed, by a predetermined factor, a quadratic sum of guaranteed accuracies of the two position information items; or,
      using a difference between the position information item and the updated position, and an inconsistency is determined when the differences exceed, by a predetermined factor, a quadratic sum of guaranteed accuracies of the position information item considered and of an estimated accuracy of the updated position; or,
      a combination thereof; and
   a data transmission step, implemented by a data transmission unit and comprising transmitting at least said updated position of the aircraft to at least one user system.

2. The method as claimed in claim 1, wherein the image processing step implements a consolidation of the detection of the characteristic pattern.

3. The method as claimed in claim 1, wherein the characteristic pattern represents at least one of the following elements:
   a landing runway used for the landing;
   at least one reflecting device, which exhibits a reflectivity greater than that of the terrain and which is installed on the terrain; and
   a natural configuration of the terrain.

4. The method as claimed in claim 1, wherein the image processing step uses a shape recognition method.

5. The method as claimed in claim 1, wherein the series of steps comprises a step of extrapolation of the position of the aircraft, the extrapolation step being implemented by an extrapolation unit between two positions determined from two successive radar images of the characteristic pattern, the extrapolation step being implemented using auxiliary data, from at least one system other than the radar.

6. The method as claimed in claim 1, wherein the series of steps is implemented, repetitively, during the approach.

7. The method as claimed in claim 6, wherein the series of steps is implemented early, before a given approach phase corresponding to a part of the approach, checks being carried out on the results obtained then, and the results of the series of steps obtained during the given approach phase being used during this approach phase only if given conditions, partly relating to said checks, are met.

8. A device for determining a position of an aircraft in an approach for a landing, the device comprising:
   at least one radar configured to take at least one radar image of the terrain in front of the aircraft in a zone containing at least one characteristic pattern, the position of said characteristic pattern being known,
   wherein the characteristic pattern comprises a reflecting element, the reflectivity of which is greater than that of the environment;
   an image processing unit configured to detect, on the radar image taken by the radar, a characteristic symbol representing said characteristic pattern,
   wherein the image processing unit determines a deformation of the characteristic symbol in the radar image, due to a perspective linked to an angle from which the characteristic pattern is seen from the radar mounted on the aircraft during the radar image capture;
   a computation unit configured to determine, from at least the position of the characteristic symbol in the image and characteristics of the radar image acquisition, so-called relative position information illustrating the position of the aircraft in relation to the characteristic pattern, and to determine the position of the aircraft, from said relative position information and from the known position of the characteristic pattern,
   wherein the computation unit uses the deformation of the characteristic symbol, to determine an attitude and a heading of the aircraft;
   an updating unit configured to determine an updated position of the aircraft by updating a so-called operational position of the aircraft using said position of the aircraft;
   a monitoring unit, configured to determine a consistency of the position of the aircraft determined by the computation unit based on position information items,
   wherein the position information items comprise:
   the position of the aircraft, deduced from a relative position radar measurement;

a GNSS position of the aircraft; and
a pure inertial position of the aircraft;
wherein the monitoring is implemented by:
  using differences in the position information items, taken two by two, and an inconsistency is determined when the differences exceed, by a predetermined factor, a quadratic sum of guaranteed accuracies of the two position information items; or,
  using a difference between the position information item and the updated position, and an inconsistency is determined when the differences exceed, by a predetermined factor, a quadratic sum of guaranteed accuracies of the position information item considered and of an estimated accuracy of the updated position; or,
  a combination thereof; and
a data transmission unit configured to transmit at least said updated position of the aircraft to at least one user system.

9. The device as claimed in claim 8, further comprising at least one of the following units:
  an extrapolation unit configured to extrapolate the position of the aircraft; and
  a monitoring unit configured to check the consistency at least of the position of the aircraft.

10. A landing aiding system, comprising at least one device for determining the position of an aircraft as claimed in claim 8.

11. The landing aiding system as claimed in claim 10, further comprising two devices for determining the position of an aircraft, independent of one another, and being configured to implement an automatic landing of the aircraft.

12. The landing aiding system as claimed in claim 10, further comprising a synthetic vision system using at least the position determined by the device for determining the position, to assist in the display.

* * * * *